Jan. 10, 1928.
J. W. SMITH
1,655,518
AIR COOLING SYSTEM
Filed Oct. 26, 1922     3 Sheets-Sheet 1
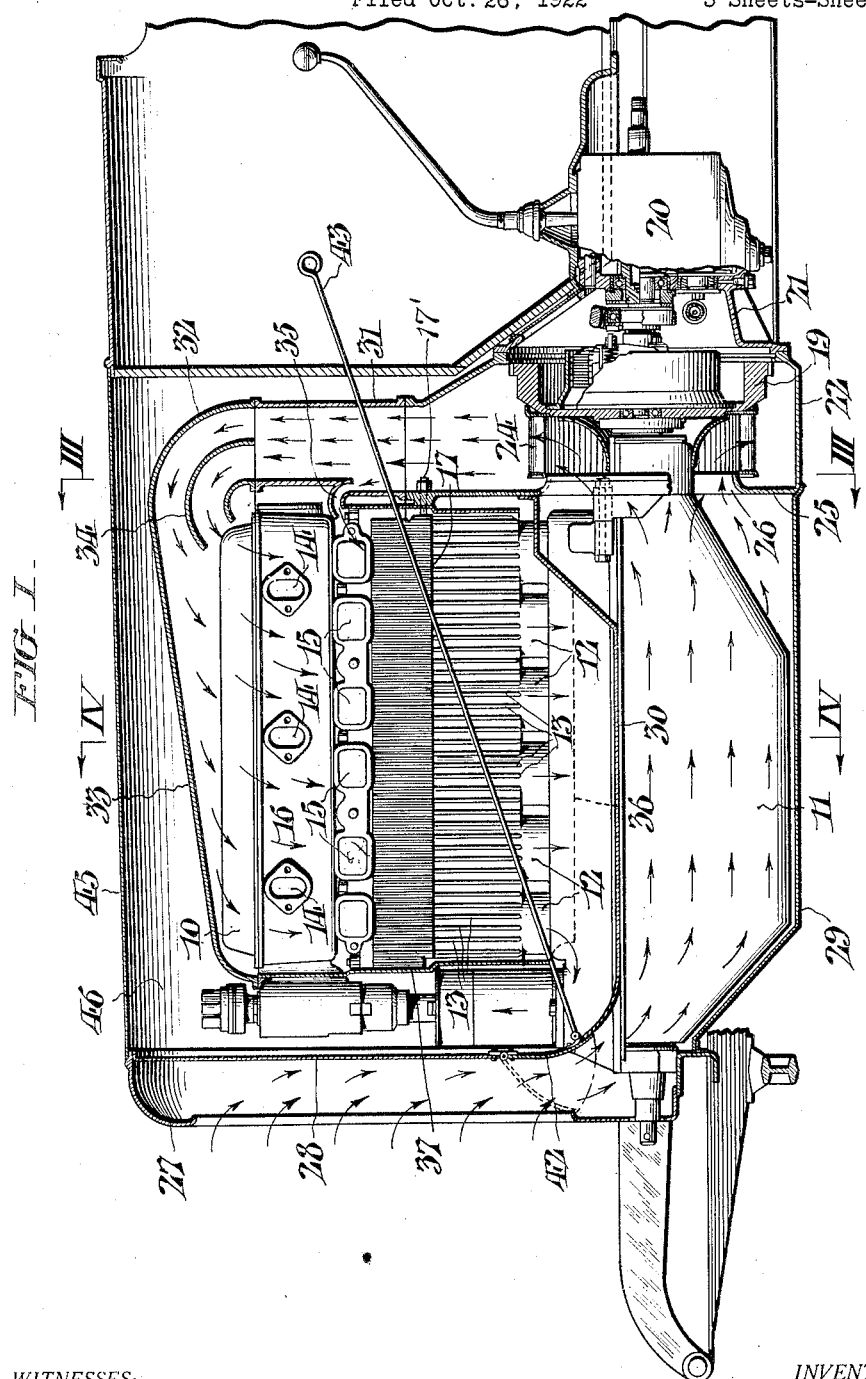
WITNESSES:
INVENTOR:
John W. Smith,
BY Fraley & Paul
ATTORNEYS.

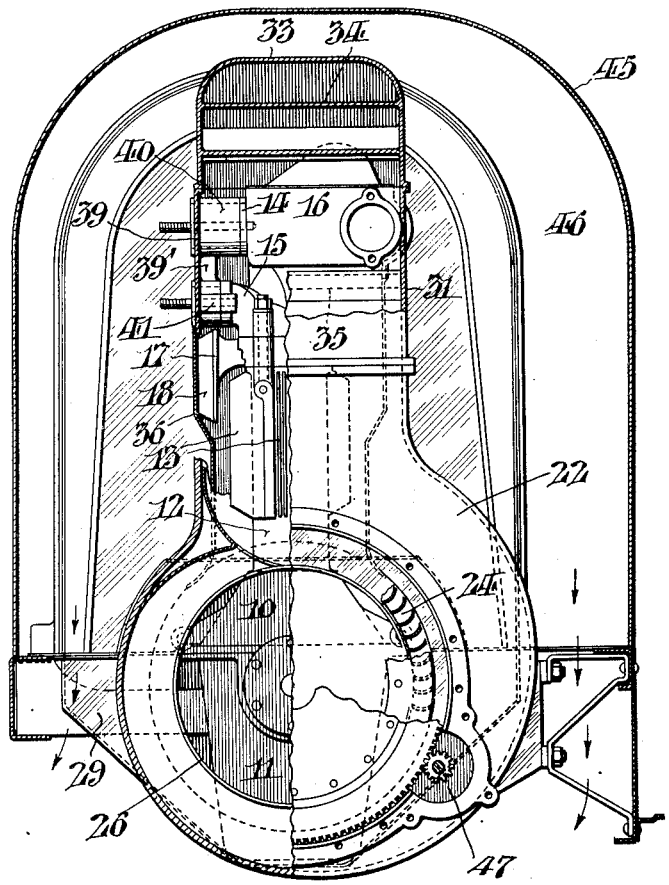

Jan. 10, 1928.
J. W. SMITH
AIR COOLING SYSTEM
Filed Oct. 26, 1922
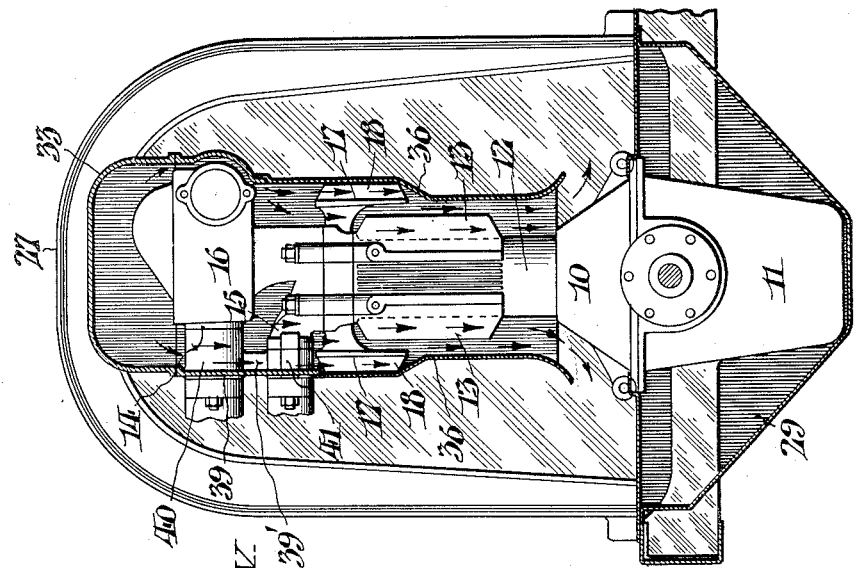
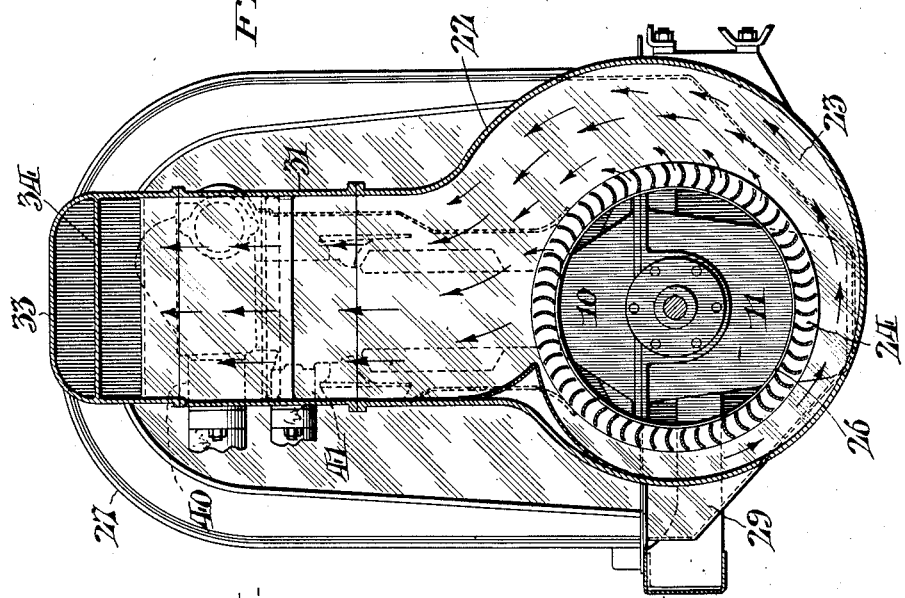
INVENTOR:
John W. Smith, Patented Jan. 10, 1928.

1,655,518

UNITED STATES PATENT OFFICE.

JOHN W. SMITH, OF PHILADELPHIA, PENNSYLVANIA.

AIR-COOLING SYSTEM.

Application filed October 26, 1922. Serial No. 597,167.

This invention relates to pressure air cooling systems for automotive vehicles, and an object of the invention is to generally improve and simplify systems of this character by the introduction of certain structural alterations among which are the mounting of the pressure fan upon the flywheel and the provision of a fan casing which functions also as an enclosure for the fly-wheel, a support for the transmission and starting motor, and in addition a partial mounting for the power plant itself.

Incidental to the location of the fan at the rear of the engine in the manner stated an improved air distributing system is ensured, wherein the cool air is drawn from the front of the hood and carried rearwardly along the crank casing to the fan, by which the air is then directed forwardly and around the engine cylinders, thereafter taking a generally downward course.

The inventive concept involved in the performance of the certain objects outlined above is capable of receiving a variety of mechanical expressions, one of which for the purpose of illustrating the invention is shown in the accompanying drawings, but it is to be expressly understood that such drawings are for the purpose of illustration only and are not designed to define the limits of the invention, reference being had to the appended claims for this purpose.

In addition to the foregoing, this invention comprehends improvements in the details of construction and arrangement of the correlated parts to be more specifically pointed out and illustrated in the accompanying drawings, in which Fig. I is a view in longitudinal section of the forward portion of a motor vehicle illustrating the power plant and the embodiment therein of my invention.

Fig. II is a view in transverse section taken through the chassis and looking in a forward direction, the parts being broken away in several planes to illustrate the relation of the parts; and Figs. III and IV are views in transverse section taken on the lines III—III and IV—IV respectively of Fig. I.

With reference to the drawings, 10 indicates generally the engine of a motor vehicle of the type suitable for air cooling, the several parts of which are identified comprehensively for the convenience of description, the oil pan being indicated at 11, and the cylinders at 12, the latter being suitably provided with heat radiating fins 13 which are structural features common to engines of this character. In the type of engine illustrated, the intake openings are indicated at 14 and the exhaust ports at 15 and are located in a superstructure 16 mounted upon the cylinders. In addition to the fins 13 a heat dispensing element may be provided in the form of one or more longitudinally extending plates 17 located at either side of the engine, and mounted in any suitable manner as upon a member located between the cylinders 12 and the superstructure 16. The plates 17 are provided with vertical ribs 18 and the entire element is formed of a metal having high heat conductive properties. The fly-wheel is indicated at 19 and the conventional form of transmission at 20, enclosed within the flanged casing 21 which in a typical form of power plant is usually bolted to the flywheel housing.

The present invention includes as its essential feature a casing 22 which is in part supported by the drip pan—later on again referred to—and attachment to the engine rear end plate as by bolts 17', Fig. I, which encloses the fly-wheel and is formed to provide a spiral circumferential passage-way 23 for cooperation with an air impelling fan 24 of conventional type and preferably mounted in accordance with the present invention directly upon the fly-wheel 19 so as to be rotated thereby. The forward end plate 25 of the casing 22 is provided with an inwardly directed shrouded opening 26 communicating with the interior of the fan 24, which, it will be noted, consists of an annular series of peripheral blades, suitably formed so as to induct air through said opening 26 and to discharge the air under pressure into the casing 23 which circumferentially widens and is designed to direct the air upwardly for distribution in a manner to be presently noted. A conical deflector as shown forms part of the fan structure to direct the air radially to the blades. The cool air is taken into the system at the forward end of the hood indicated at 27 forming a false radiator and including a vertical partition 28 which directs the air downwardly and into a longitudinal passage created by the provision of a drip pan 29 located beneath the oil pan and enclosing the same. Said passage is also defined by the provision of a horizontal diaphragm 30 which sub-divides the interior of the hood so as to form an upper chamber or hood enclosure and a lower chamber containing the crank case. The diameter of the fan is held within restricted limits of design by widening the fan housing in the direction of its axis, while the fly-wheel constitutes a division wall between the transmission and fan casing.

The spiral casing 22 terminates at a point adjacent the upper ends of the cylinders and is suitably flanged for connection to an intermediate conduit section 31, the upper end of which in turn is adapted for connection to the inlet end of a removable cap conduit 32 having a forwardly directed portion 33 which encloses the superstructure of the engine. The cap conduit 32 is provided with one or more curved partitions 34 therein for the purpose of dividing the air stream issuing from the conduit 31 for better distribution of the air. The conduit 31 may be provided with a curved outlet 35 for directing a portion of the air stream upon the rearmost engine cylinders, as shown in Fig. I. In this manner the air stream is subdivided and directed upon the engine at the points of greatest heat radiation to equalize cylinder temperatures under all conditions. Each side of the engine is covered by means of a removable side plate 36 cooperating with a forward end plate 37, said plates being supported so as to entirely enclose the engine in conjunction with the air conduits with the exception of the lower portion thereof around the base of the cylinders where the plates are deflected away to provide outlets for the warm air at each side of the engine. In the type of engine illustrated, I provide a plate 39 at the left hand side bridging the space between the upper edge of the side plate 36 and the side wall of the conduit 33 at the point of separation made necessary to permit the entry into the enclosure of sleeves 40 and 41 constituting connections to the intake and exhaust ports respectively. The sleeves it will be noted may be connected by a web 39' which functions to transfer heat from the exhaust sleeve to the intake sleeve. It will be apparent that the plate 39 also functions in a similar manner to exchange heat between the sleeves, and in fact either the web connection or the plate may be optionally employed, or either may be discarded in favor of the other.

From the foregoing it will be seen that during operation of the power plant, either when traveling or when idling, the cool air is drawn through the false radiator and deflected downwardly by the partition 28. The air is then conducted along the channel above the drip pan, into the spiral housing 22, and by virture of the fan is impelled under pressure around the spiral casing 22 and thence upward through the conduit section, then directed forwardly by the casing 33 and finally distributed to the several parts of the engine issuing around the lower edges of the side plates 36. The rear end of the crank case or oil pan extends partially into the fan housing and the sides are spaced from the edges of the opening 26 to freely permit the air to flow along the oil pan and into the housing. As a result of this arrangement the fan is located at the rear of the engine instead of at the front in accordance with the usual practice, accruing in several advantages among which is the elimination of noise since any sound which the fan might cause will be unheard when the fan is located in the manner shown.

During rearward passage over the drip pan the air is filtered of dust and moisture, and the oil pan incidentally subjected to air cooling, as the presence of a layer of oil in the drip pan acts as a cohering medium to retain dust and moisture that may be carried into the front of the machine.

If desired, the partitions 28 and 30 may be interrupted to provide an opening which is controlled by means of a swinging door 42 provided with a rearwardly extending rod 43 for convenient actuation, whereby the door may be either disposed in its full lined position shown in Fig. I to permit passage and distribution of air in the manner described, or swung to its dotted line position, the effect of which is to close the lower channel against the entry of cool air from the outside and in lieu thereof to set up a continuous circulation of air from the engine through the opening, and through the channel above the drip pan to the fan. In this way air heated by the engine may be recirculated for the purpose of warming up the engine while starting in cool weather. The door is susceptible of adjustment to vary the relative amounts of cool and warm air entering into the system to thus conform cooling conditions to the prevailing meteorological condition.

When the door is open or in its dotted line position a closed circuit type of air circulation is provided that permits a mode of operation of the cooling system quite different from anything heretofore provided in that, it is possible to maintain a normal working temperature during all seasons of the year. When the system is working with the closed path of circulation the hood 45, enclosing the power plant, occupies a new and definite relation to the cooling system and by enclosing a static body of air permits said static body of air to constitute an equalizing zone 46, the temperature of which is to be maintained at a point conducive to the proper operation of the engine. The temperature determined by practice is approximately one hundred degrees Fahrenheit.

The hood, in this capacity functions also as a heat radiating element, and during cold weather acts to maintain the normal working temperature at the point stated within its enclosure.

Thus, if the outside temperature should be very low the door 42 may be retained in dotted position causing a re-circulation of air around the engine, through the lower channel and conduits, permitting the air to gather heat and radiate the heat to the zone 46 of normal working temperature. From there the heat is radiated to the hood and thence to the atmosphere. By reason of the large radiating area of the hood its presence acts as a control through the intermediary of the static zone 46, upon the cooling system and therefore constitutes a part of the cooling system. Obviously the same principle may be applied to any other internal combustion engine than that intended for automotive use, in which event the enclosure constituting the equivalent of the hood may be termed an element to define and control by heat radiation a zone of normal working temperature surrounding the engine.

When the temperature of the outside air is milder the door 42 may be judiciously adjusted to permit the entry of sufficient cool air from the outside to enter the circulating system and by correlation of the cooling value of the additional air to the radiating efficiency of the hood or other zone defining element act to maintain the intermediate zone at the proper working temperature. If desired a thermostatic control device may be located in the intermediate zone with operating connections to the door 42 to actuate the same at proper intervals to automatically maintain a desired working temperature. It is to be noted that when operating on the closed circuit the warm circulating air in flowing along the oil pan will act to warm the oil contained therein and thus cause the lubricant to flow freely to the working parts. When operating on the closed circuit the air within the hood remains substantially static, but when the door 42 is closed to full line position the air flowing from the lower edges of the engine enclosure is forced through the hood enclosure and effects an exit at the rear edge of the horizontal diaphragm and around the sides of the fan casing between the same and the chassis frame members as shown in Figure II.

It will be observed that the casing 22 not only functions as an enclosure for the fan and fly wheel, but also as a partial mounting for the power plant effected by means of the usual brackets extending from the chassis frame and provided with a connection to the casing. In addition the said casing affords a support for the transmission 20 as it will be observed from Figure I that the flanged casing 21 is bolted directly to the fan casing 22, the rear wall of the fan casing having an opening through which the clutch and shaft extend into the transmission housing. The starting motor indicated at 47—Fig. II—may also be bolted upon an extension of the fan casing provided for that purpose. Other advantages of the structure described will be readily apparent to those familiar with the art to which this invention appertains.

Having thus described my invention, I claim:

1. In an automotive vehicle the combination with the engine cylinders, fly-wheel including a clutch, and a pressure fan mounted directly upon said fly-wheel, of a casing intermediate the engine end plate and transmission housing functional to inclose the fan and fly-wheel while defining an air passage over-shot relative to the engine cylinders, said casing having an inlet and an outlet for directing air under pressure forwardly over and against the engine cylinders.

2. In a motor vehicle, the combination with the powerplant including the engine cylinders thereof; the fly-wheel and transmission of a spiral casing enclosing the fly-wheel, a fan mounted in said casing, said casing having end openings, the forward opening receiving air, said transmission covering the opposite opening by the support of the transmission casing upon the fan casing, and an outlet conduit for said casing extending upwardly and forwardly to direct the air upon the engine cylinders.

3. In a motor vehicle the combination with the power plant, engine cylinders thereof, and a drip pan supported beneath the same of a horizontal diaphragm located above the pan defining a channel to conduct air rearwardly, a fan and casing located at the rear of the power plant to receive the air and direct the same under pressure, and a conduit communicating with the casing to direct the air forwardly and down upon the engine cylinders.

4. In a motor vehicle, the combination with the power plant and engine cylinders thereof, of means forming a channel to convey air rearwardly, a fan and spiral casing located at the rear of the power plant receiving the air from said channel, said spiral casing functioning as a partial support for the power plant, a cap conduit communicating with the casing to convey the air upwardly and forwardly over and against the engine cylinders and side plates enclosing said engine cylinders in spaced relation to conduct the air downwardly along the cylinders for escape around the lower edges of said plates.

5. In a motor vehicle, the combination with the power plant engine and the drip pan supported therebeneath of horizontal and vertical partitions, the latter defining a deflector at the front of the engine to direct air downwardly and the former cooperating with the oil pan to form a channel, and means at the rear of the engine to receive the air and direct the same forwardly and downwardly upon the cylinders of the aforesaid engine.

6. In a motor vehicle, the combination with the hood and power plant of engine cylinders, a substantially vertical partition and a horizontal diaphragm defining a lower channel to conduct air rearwardly, means to receive the air and direct the same forwardly and downwardly upon the engine cylinders, said partition and diaphragm being interrupted by an opening, and means to close the opening to effect air distribution in the manner stated and when opened to permit circulation of air through said opening.

7. In a motor vehicle, the combination with the power plant and engine cylinders thereof, of a channel to conduct air rearwardly, a fan and spiral casing at the rear of the motor to direct the air upwardly under pressure, an intermediate conduit section supported upon the outlet of said casing and having an outlet directing an air stream against the rear cylinders, a removable cap conduit communicating with said intermediate section to convey the air forwardly over and downwardly about the engine cylinders, a partition in said cap conduit dividing the air stream, and plates enclosing the sides of the engine to conduct the air downwardly for escape around the lower edges of said plates.

8. In a motor vehicle, the combination with the power plant and engine cylinders thereof, of means to conduct cooling air along the engine oil pan, a spiral fan casing having an opening to receive the air at a point between the oil and fan casing, an air impelling fan in the casing, said casing having an outlet directed against the engine cylinders and forming an enclosure for the flywheel and clutch.

9. The combination in an internal combustion motor and the cylinder thereof, of a plate, sleeves formed therewith for connection to the intake and exhaust ports, a web connecting said sleeves for heat transference, side plates cooperating with said plate to form a cylinder enclosure, a cap conduit to distribute air downwardly within the enclosure, and heat radiating elements of efficient thermo-conductive metal forming part of the cylinder structure and having ribs running parallel to the direction of air flow.

10. The combination of an internal combustion engine, a closed circuit air cooling means including an air pressure fan rearwardly located adjacent the engine fly-wheel, and means defining a zone of normal working temperature surrounding the engine and functioning also as a heat radiating means to maintain the temperature of the zone.

11. The combination of an internal combustion engine, an engine cooling means including a closed-in air pressure fan rearwardly located adjacent the engine fly-wheel and adapted to recirculate air around the engine, and means defining a zone of normal working temperature surrounding the engine and functioning to control the rate of heat radiation from the engine, and maintain constant the temperature of said normal temperature zone.

12. The combination of an internal combustion engine, an enclosure for the engine cylinders including a lateral path of flow, including an air pressure fan rearwardly located adjacent the engine fly-wheel to recirculate air through the enclosure to constitute a closed circuit air cooling system, and means surrounding the enclosure to define a zone of normal working temperature, and functioning conjointly to control by heat radiation from itself, the radiation of heat from the engine, and to maintain constant the temperature of said normal zone.

13. In an automotive vehicle, the combination of the power plant, and hood enclosing the same, and a closed circuit air cooling means including an air pressure fan rearwardly located adjacent the engine fly-wheel to equalize heat radiation from the engine, said hood defining a zone of normal working temperature surrounding the engine and by virtue of its heat radiating capacity acting to maintain constant the temperature of said zone against low atmospheric temperature.

14. The combination of an internal combustion engine, a closed circuit air cooling means, including an air pressure fan rearwardly located adjacent the engine fly-wheel, means adapted to define a zone of normal working temperature surrounding the engine and to function as a heat radiating means to maintain constant said zone, and controllable means for admitting as required quantities of cool air into the cooling means and exhaust a corresponding amount of warm air to control the functions stated against changes in atmospheric temperature.

In testimony whereof, I have hereunto signed my name at Philadelphia, Pennsylvania, this 21st day of October, 1922.

JOHN W. SMITH.